United States Patent [19]

Wiczer

[11] 4,128,222
[45] Dec. 5, 1978

[54] LEG ASSEMBLY FOR PINBALL GAME

[75] Inventor: Max Wiczer, Skokie, Ill.

[73] Assignee: Wico Corporation, Niles, Ill.

[21] Appl. No.: 876,359

[22] Filed: Feb. 9, 1978

[51] Int. Cl.² ............................................. A47B 13/00
[52] U.S. Cl. .................................... 248/188; 108/156; 403/217
[58] Field of Search ............... 403/217, 219; 108/156; 248/188, 188.1, 188.6

[56] References Cited

U.S. PATENT DOCUMENTS

| | | | |
|---|---|---|---|
| 1,834,313 | 12/1931 | Kaufman | 248/188 |
| 2,143,542 | 1/1939 | Clarin | 248/188 |
| 2,172,687 | 9/1939 | Anderson et al. | 248/188 X |
| 2,588,818 | 3/1952 | Franks | 403/217 |
| 3,341,160 | 9/1967 | Jones | 108/156 X |
| 3,420,484 | 1/1969 | Mattick | 248/188 |
| 3,590,753 | 7/1971 | Blink et al. | 248/188 X |
| 3,945,740 | 3/1976 | Weiler | 403/217 |

Primary Examiner—Roy D. Frazier
Attorney, Agent, or Firm—Vogel, Dithmar, Stotland, Stratman & Levy

[57] ABSTRACT

An angle member is attached to the intersecting side walls of a pinball game by means of screws or the like. A channel member is fixedly attached, as by welding, adjacent to the interior corner of the angle member, the corners of the channel defining stops in contact with the intersecting side walls. A leg having substantially perpendicular flanges is in juxtaposition with the flanges of the angle. Screws attach the legs to the channel.

13 Claims, 7 Drawing Figures

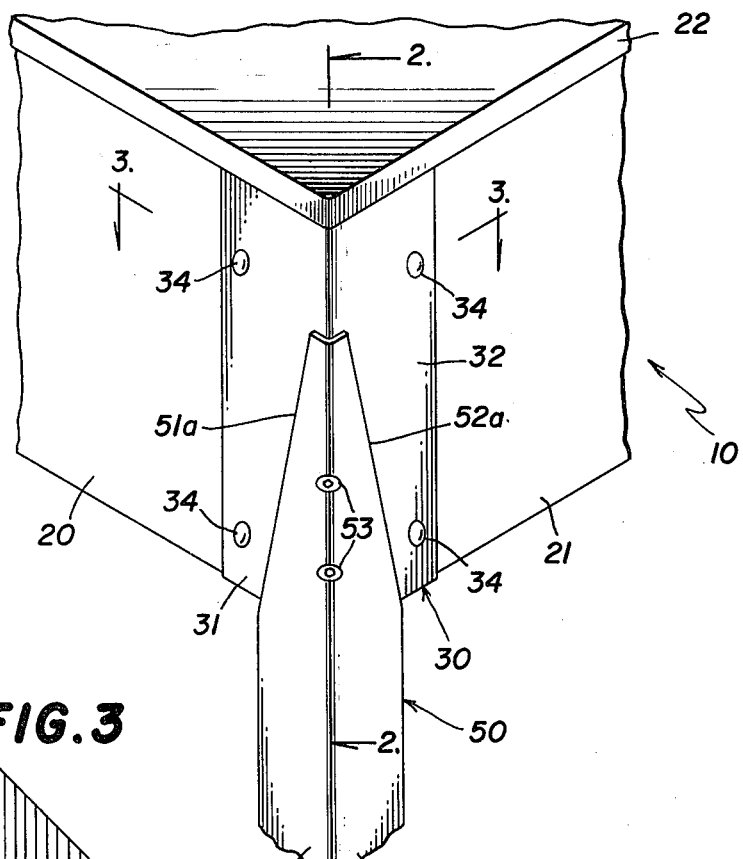
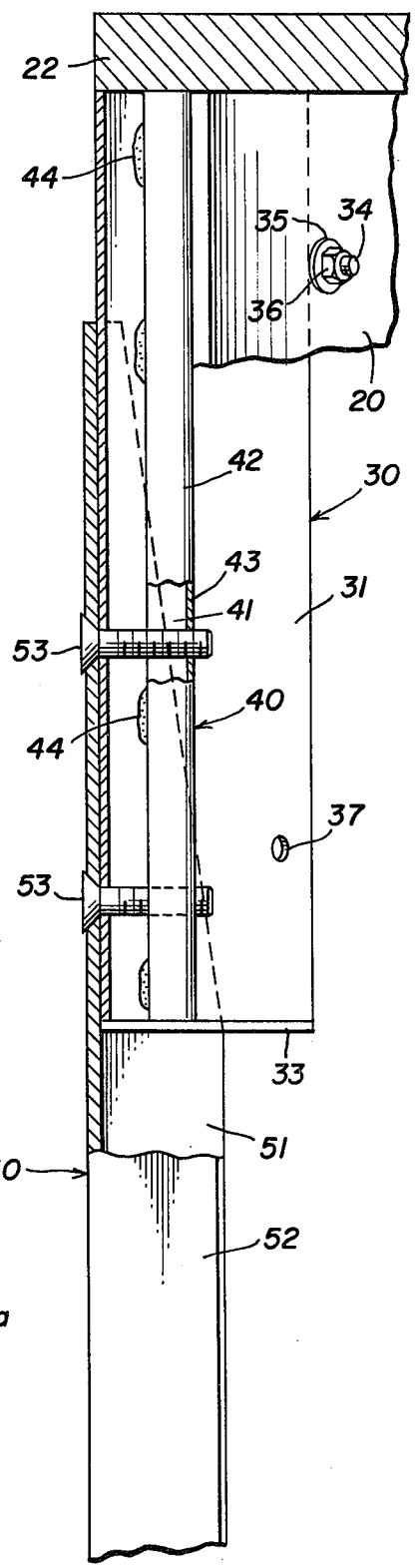
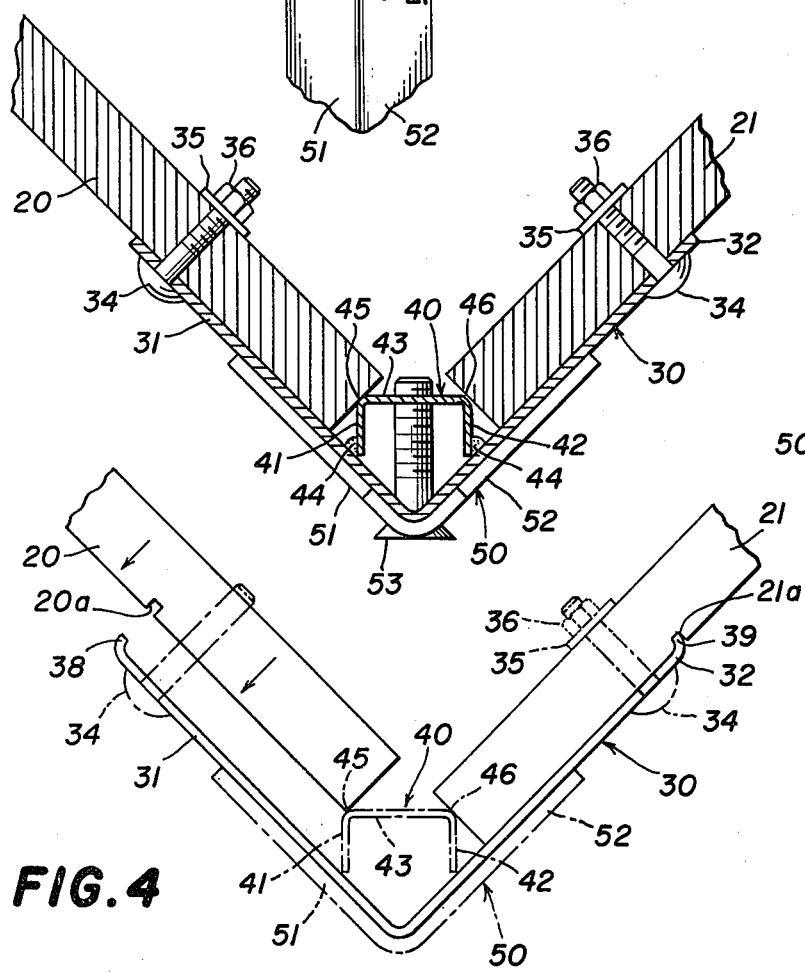

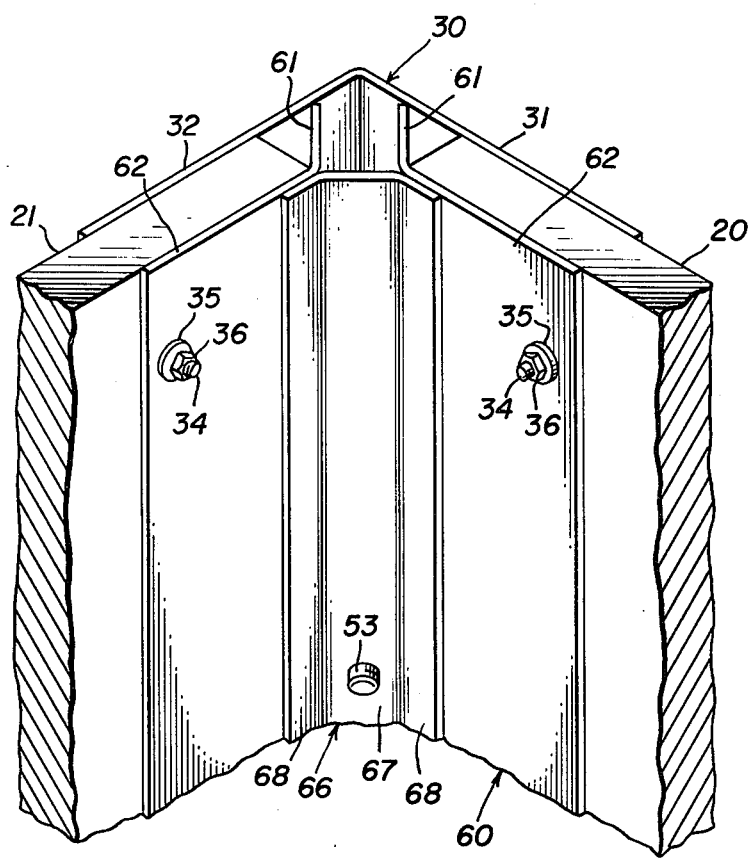
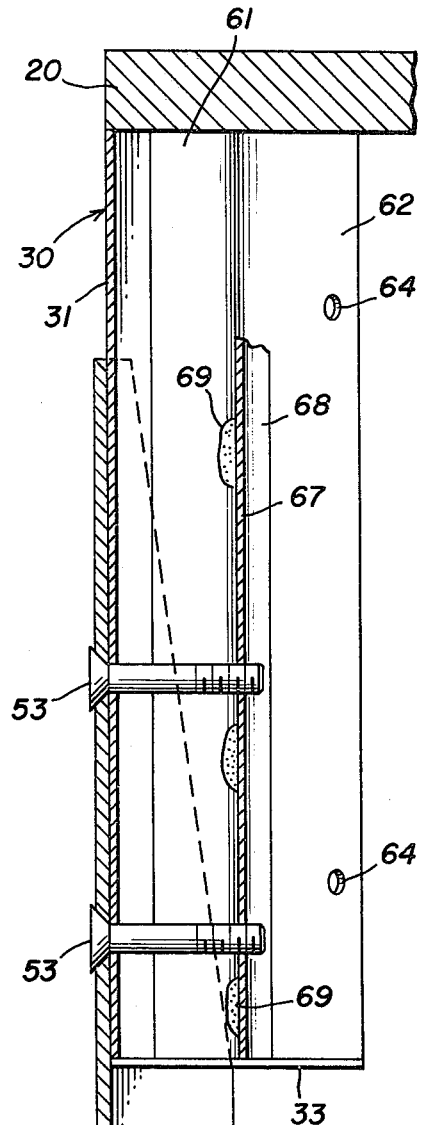
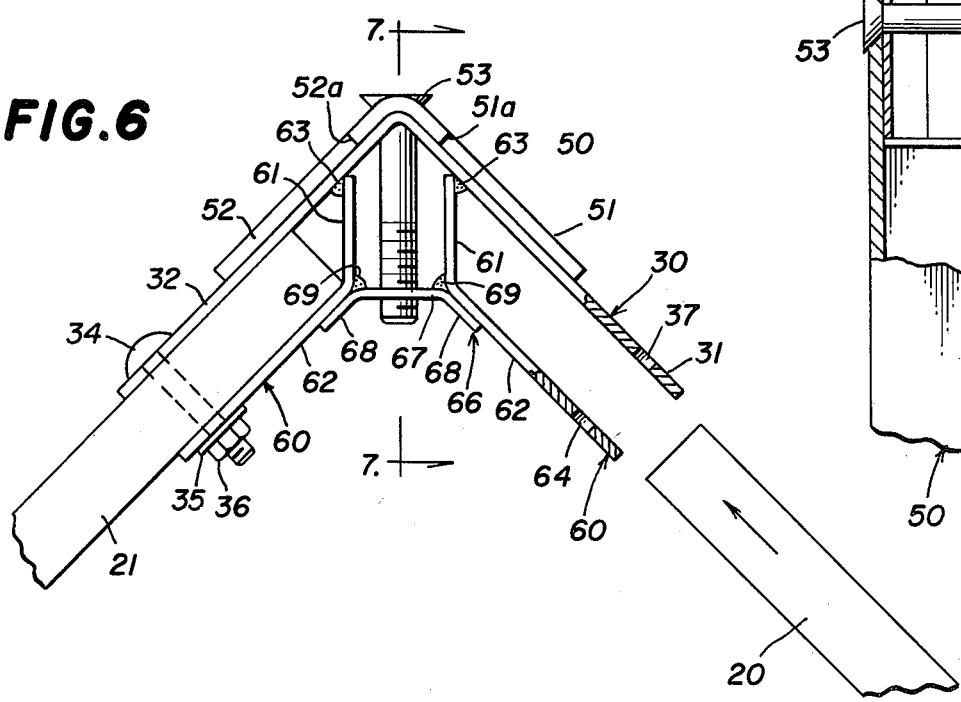

LEG ASSEMBLY FOR PINBALL GAME

BACKGROUND OF THE INVENTION AND PRIOR ART STATEMENT

A pinball game commonly has four side walls arranged to form a rectangular cabinet in which is mounted a playfield board. Steel balls are projected onto the board to operate various targets. Four legs are respectively mounted to the corners of the cabinet. In the past, the assembly process required attachment of wood blocks to the interior corners of the cabinet. Holes were then drilled in the corners, through the blocks, and a "T" nut was affixed to each block. Bolts were inserted through the leg, the holes in the cabinet and threaded into the "T" nuts. This approach is time consuming because it requires mounting the blocks into position, then drilling holes in the cabinet and the blocks. Furthermore, these blocks, being made of wood, often break and must be replaced. Also, the difficulty of attaching these blocks meant that the walls of the cabinet would have to be attached at the factory, that is, they could not be shipped knocked down and assembled by the retailer or the consumer.

No patentability search was conducted.

SUMMARY OF THE INVENTION

It is therefore an important object of the present invention to provide an improved means for attaching the legs to the cabinet of a pinball game.

Another object is to provide a pinball game in which the side walls can be shipped disassembled and can readily be assembled by the retailer or the consumer.

Another object is to provide a means for attaching the legs to the cabinet of a pinball game, which is not likely to be broken or become disconnected.

Another object is to provide a secure means for attaching the legs of a pinball game.

In summary, there is provided a leg assembly for a pinball game having two side walls intersecting to define a corner, the leg assembly comprising an angle member on the corner and having a pair of substantially perpendicular angle flanges respectively abutting the side walls, first fastening means attaching the angle member to the walls, a channel member having a pair of channel flanges respectively attached to the angle flanges, the intersections of the bight and the channel flanges respectively defining stops respectively in contact with the side walls, a leg having substantially perpendicular leg flanges respectively in juxtaposition with the angle flanges, and second fastening means securing the leg to the angle member.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWINGS

For the purpose of facilitating an understanding of the invention, there is illustrated in the accompanying drawings, preferred embodiments thereof, from an inspection of which, when considered in connection with the following description, the invention, its construction, and operation, and many of its advantages should be readily understood and appreciated.

FIG. 1 is a perspective view of one corner of a pinball game in which the leg is attached in the manner of the present invention;

FIG. 2 is a view in vertical section along the line 2—2 of FIG. 1, on an enlarged scale;

FIG. 3 is a view in horizontal section taken along the line 3—3 of FIG. 1, on an enlarged scale;

FIG. 4 is a view like FIG. 3 but showing a modification;

FIG. 5 is a perspective view of a corner of a pinball game viewed from its interior, showing another embodiment of the present invention, with the top removed;

FIG. 6 is a top plan view of FIG. 5, except that one of the side walls of the pinball game is shown preparatory to being mounted in place; and FIG. 7 is a view in vertical section taken along the line 7—7 of FIG. 6.

DETAILED DESCRIPTION OF THE PREFERRED EMBODIMENTS

Turning now to the drawings, there is depicted in FIGS. 1-3 a leg assembly 10 constituting one embodiment of the present invention. The leg assembly 10 is part of the cabinet of a pinball game, a fragmentary corner portion of which is shown in FIG. 1. Such cabinet is usually rectangular and has two long side walls and two short side walls which intersect to define four corners. In FIG. 1 two such side walls 20 and 21 are shown. A common height of the side walls 20 and 21 is about 8 inches. The side walls 20 and 21 and the other two which are not shown support a transparent cover 22. The playfield board (not shown) is mounted in the cabinet, beneath the cover 22. Pinballs are delivered one at a time onto the playfield board and the player can watch the progress of each ball, through the transparent cover 22. For simplicity, the usual decorative escutcheon strips that conceal the junctions of the cover 22 and the side walls are not shown.

The leg assembly 10 includes an angle 30 having a pair of substantially perpendicular flanges 31 and 32 which lie in juxtaposition respectively with the side walls 20 and 21. One end of each flange 31 and 32 is turned inwardly to define a shelf, the shelf 33 on the flange 31 being shown in FIG. 2. The side wall 20 rests upon the shelf 33, and the other side wall 21 rests on the corresponding shelf of the flange 32. Preferably the length of the angle 30 is substantially equal to the height of the walls 20 and 21. The wall 20 is attached to the flange 31 by means of a pair of bolts 34, washers 35 and nuts 36. The wall 21 is similarly attached to the flange 32.

The leg assembly 10 further comprises a channel 40 having a length substantially the same as the length of the angle 30, the channel 40 having a pair of substantially parallel flanges 41 and 42 joined by a bight 43. The channel 40 is welded to the angle 30 by means of welds 44 between the flanges 31 and 41 on the one hand and the flanges 32 and 42 on the other hand. The bight 43 faces the interior corner of the angle 30. The intersection between the flange 41 and the bight 43 defines a vertically extending corner 45, while the junction between the flange 42 and the bight 43 defines a vertically extending corner 46. These corners 45 and 46 provide stops for the side walls 20 and 21 as will be explained.

The leg assembly 10 further comprises a leg 50 defined by a pair of substantially perpendicular flanges 51 and 52, the upper end portions 51a and 52a being tapered as shown. A pair of bolts 53 pass through openings in the corner of the leg 50 and engage in threaded openings in the bight 43 of the channel 40.

Usually the cabinet will be assembled at the factory along with the cover 22 and the playfield board. The consumer need only assemble the legs and the score unit (not shown) and perhaps some other items such as the ball shooter assembly. At the factory, the side walls are assembled together using four angles respectively at the corners. For example, the side walls 20 and 21 are assembled using the angle 30 and associated channel 40. The corner 45, as previously explained, constitutes a stop for the edge of the side wall 20. The assembler places the side wall 20 on the shelf 33 against the flange 31 and slides the side wall until its end strikes the corner 45. Then the bolts 34 are inserted through the holes 37 and corresponding holes in the wall 20. The washers 35 and the nuts 36 are then applied. The wall 21 is assembled onto the other flange 32 in a similar manner. The walls 20 and 21 cannot undesirably rotate because they rest on shelves and because they contact the corners 45 and 46. The consumer usually attaches the legs. For example, the leg 50 is placed in position as shown and then the bolts 53 are passed through preformed holes in the corner of the leg 50 and threadably engage holes in the bight 43 of the channel 40, thereby firmly connecting the leg 50.

Because there are no wooden blocks, there is no need to have holes drilled at the factory. In the past, the assembler would mount the wooden blocks on the interior of the juncture of the side walls, drill holes in the juncture and the block, and then apply a T-nut. This was time consuming. Furthermore, the blocks tended to break while being assembled by the consumer. With the leg assembly 10, there are no blocks to break or drill. The assembly process is so simple that the side walls themselves could be shipped knocked down. The consumer could assemble the walls in the manner described.

A second embodiment of the invention is shown in FIG. 4. The leg assembly therein shown has basically the same construction as the leg assembly 10 of FIGS. 1 to 3 and therefore the parts bear the same reference numerals. In this embodiment, however, the ends of the flanges 31 and 32 of the angle 30 are respectively inturned to define lips 38 and 39 which slip into grooves 20a and 20b respectively in the side walls 20 and 21. The lips 38 and 39 further limit any tendency of the side walls 20 and 21 from rotating.

A third embodiment of the invention is illustrated in FIGS. 5-7. In this embodiment, the leg assembly comprises an angle 30 and a leg 50 constructed precisely like the angle 30 and the leg 50 in the embodiment of FIGS. 1 to 3. Further description of these two elements is unnecessary. The leg assembly of FIGS. 5 to 7 does however have a different form of interior member welded to the angle 30. The leg assembly includes a pair of confining members 60 each including flanges 61 and 62 joined as by welds 63 to the angle 30. The flanges 62 are disposed respectively parallel to the flanges 31 and 32 of the angle 30 and spaced respectively therefrom a distance approximately equal to the thickness of the side walls 20 and 21. One flange 62 has a hole 64 aligned with the hole 37 in the flange 31. The other flange 62 has a similar hole, these holes accommodating the bolts 34. There is also provided a bracing member 66 having a bight 67 and flared attachment flanges 68, these attachment flanges 68 being attached as by welds 69 to the flanges 62. The bight 67 is perpendicular to the flanges 61, whereby these three elements define a channel. The bight 67 faces the interior corner of the angle 30. The corners of this channel or, in other words, the junctions of the flanges 61 and 62 define vertically extending stops for the side walls 20 and 21 as will be explained.

In assembling the side wall 20, it is fitted in the space between the flanges 62 and 31 and slid until its end strikes the stop defined by the juncture between the associated flanges 61 and 62. Then bolts 34 are inserted through the holes 37, corresponding holes in the wall 20, and through the holes 64. The washers 35 and nuts 36 are then applied. The wall 21 is assembled into the space between the flange 32 and associated flange 62 in a similar manner. The consumer can assemble the four legs in the same manner described above with respect to the embodiment of FIGS. 1-3.

While there have been considered what are at present considered to be the preferred embodiments of the invention, it will be understood that various modifications may be made therein, and it is intended to cover in the appended claims all such modifications as fall within the true spirit and scope of the invention.

I claim:

1. A leg assembly for a pinball game having two side walls intersecting to define a corner, said leg assembly comprising an angle member on the corner and having a pair of substantially perpendicular angle flanges respectively abutting the side walls, first fastening means attaching said angle member to the walls, a channel member having a bight and a pair of channel flanges respectively attached to said angle flanges, the intersections of said bight and said channel flanges respectively defining stops respectively in contact with the side walls, a leg having substantially perpendicular leg flanges respectively in juxtaposition with said angle flanges, and second fastening means securing said leg to said angle member.

2. The leg assembly of claim 1, wherein the length of said angle member is substantially equal to the height of the side walls.

3. The leg assembly of claim 1, wherein said angle member has a shelf to support the side walls.

4. The leg assembly of claim 1, wherein said angle member has a shelf on each of said angle flanges respectively to support the side walls.

5. The leg assembly of claim 1, wherein said channel member is of one-piece construction.

6. The leg assembly of claim 1, wherein said channel flanges are perpendicular to said bight.

7. The leg assembly of claim 1, wherein said channel flanges are welded respectively to said angle flanges.

8. The leg assembly of claim 1, wherein said bight has at least one threaded opening, and said second fastening means includes a screw passing through an opening in the corner of said angle member and threadably engages in said threaded opening.

9. The leg assembly of claim 1, wherein the sides of said angle flanges are inturned to define lips, each of the side walls having a groove to receive the associated lip.

10. The leg assembly of claim 1, and further comprising a pair of confining flanges disposed respectively parallel to said angle flanges and spaced therefrom a distance about equal to the thickness of each of the side walls, the side walls being respectively disposed in the spaces between the angle flanges and associated confining flanges.

11. The leg assembly of claim 10, wherein said confining flanges are respectively integral with said channel flanges.

12. The leg assembly of claim 10, wherein said bight is welded to said channel flanges.

13. The leg assembly of claim 10, wherein each angle flange and the associated confining flange have aligned openings, said first fastening means being a screw passing through aligned openings and through the associated side wall.

* * * * *